Dec. 31, 1963 B. A. PARR ETAL 3,115,918
NUT HAVING ELASTIC LOCKING RING SECURED AT ONE END AND METHOD OF SECURING SAME
Filed Sept. 4, 1959
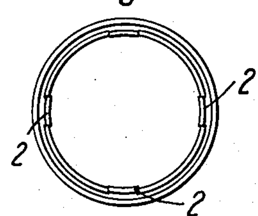
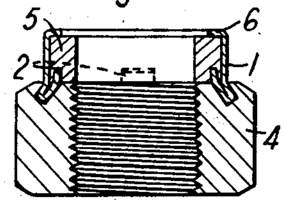
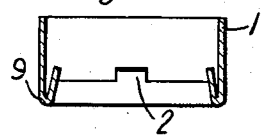
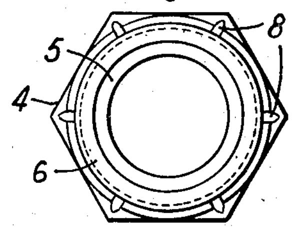
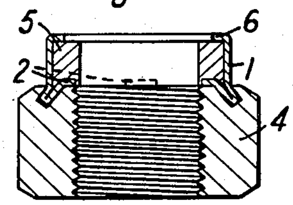
Fig.3.
3
4
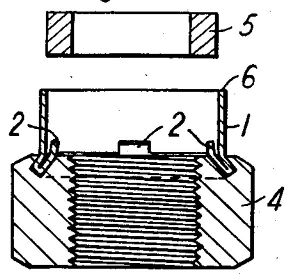
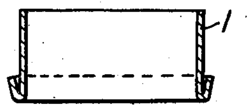

United States Patent Office 3,115,918
Patented Dec. 31, 1963

3,115,918

NUT HAVING ELASTIC LOCKING RING SECURED AT ONE END AND METHOD OF SECURING SAME

Bernard Arthur Parr, East Sheen, London, Eric Herbert Lowe, Kensington, London, and John Allan Bryan, Barnes, London, England, assignors to Parr Equipment Company Limited, London, England Filed Sept. 4, 1959, Ser. No. 838,198
Claims priority, application Great Britain Sept. 5, 1958
5 Claims. (Cl. 151—7)

This invention relates to the manufacture of locknuts of the kind sometimes known as elastic stopnuts and in which a ring of elastic material, for example fibre or nylon, is secured in or on one end face of the nut body, the internal diameter of the ring being somewhat less than the maximum diameter of the bolt or screw with which the nut is intended to be used.

The body of such a nut is customarily manufactured by machining from solid stock so as to provide an integral upstanding collar defining a recess in which the elastic ring or locking member is housed, the outer end of the collar being subsequently deformed to grip the ring and lock it in position. Since this method is expensive and wasteful of material, attempts have been made to form the collar separately from the nut body and to secure them together.

It has, for example, been proposed to secure an elastic locking member on the end face of a nut body by means of a collar which is secured to the nut body by welding or brazing. Such methods are, however, expensive and unsatisfactory particularly because it is very difficult satisfactorily to weld a thinner part, the collar, to a thicker part, the nut body.

It is a principal object of the present invention to provide an improved locknut of the elastic stop type which avoids the above-mentioned difficulties and which is inexpensive and simple in manufacture.

A further object of the invention is to provide a simple means for securing on the end face of a nut body of standard shape a collar by which a ring or insert of elastic material may be held firmly against the end face of the nut body.

It is also an object of the present invention to provide an improved method of locking the ring of elastic material to the nut body in such manner as to prevent rotation of the ring relative to the nut body.

A further and important object of the invention is to provide an improved method of manufacturing elastic stop-nuts by which standard nut blanks of any size can be readily and simply converted into locknuts.

Other objects and advantages of the invention will become apparent during the course of the following description of one form of locknut in accordance with this invention with reference to the accompanying drawing, in which:

FIGURE 1 is a plan view and FIGURE 2 a section on the line X—X of FIGURE 1, of a collar, FIGURE 3 is a longitudinal section of a nut body, FIGURE 4 is a longitudinal section showing the collar of FIGURES 1 and 2 assembled on the nut body of FIGURE 3, FIGURES 5 and 6 are respectively a section and a plan view of the completed nut, FIGURE 7 is a section similar to FIGURE 5 but showing a modification, while FIGURE 8 is a section similar to FIGURE 2 but showing a modification.

Referring firstly to FIGURES 5 and 6 of the drawing, the completed locknut of this invention comprises a collar 1 which is secured on one end face of a nut body

4 and which provides a housing for a ring 5 of elastic material which constitutes a locking member. As is conventional in locknuts using such a locking member, the internal diameter of the ring 5 is slightly less than the maximum external diameter of the bolt or screw with which the locknut is to be used and the material of which this ring is made is consequently deformed as the nut is screwed on to the bolt.

As shown in FIGURES 1 and 2, the collar 1 is formed of a hollow cylindrical piece of suitable metal having, for example, four axially extending projections 2. The collar may be formed of tubular material or may be formed of strip material which is rolled or drawn to cylindrical form. That end of the collar which is provided with the axial projections is then folded inwardly against the inner wall of the collar so as to form an end portion 9 of double thickness and so that the projections 2 lie more or less against the wall of the collar.

The nut body shown in FIGURE 3 is formed on one end face with an annular groove 3 which is of frusto-conical shape with parallel side walls and which has a greater mean diameter at its root than at its opening in the end face of the nut body. Alternatively the mean diameter at the root of the groove 3 may be smaller than that of the opening in the end face.

The mean diameter of the end portion 9 of the collar 1 is substantially the same as that of the opening of the groove 3 in the nut body while the thickness of this end portion is also substantially the same as or slightly less than the width of the groove 3.

In order to assemble the collar on the nut body its end portion 9 is seated in the end of the groove 3 and axial pressure applied so as to force this end of the collar into the groove. During this operation the end portion 9 of the collar is expanded as it is thrust against the conical inner wall of the groove 3 and once this end of the collar has penetrated completely to the root of the groove, the collar will be securely attached to the nut body.

FIGURE 4 shows the nut body 4 with the collar 1 assembled thereon and it will be seen that the groove has been completely filled by the end of the collar. Owing to the change in diameter of the end portion 9 of the collar which occurs during this operation, the joint between the collar and the nut body is extremely strong and very considerable axial pressure will be required in order to separate them.

The joint is also strong as regards relative axial rotation of the two parts but if necessary the metal of the nut body 4 at the outer edge of the groove 3 may be deformed as shown at 8 in FIGURE 6 in order to provide greater security as regards relative axial rotation.

After the attachment of the collar 1 to the nut body 4 the locking member 5 is inserted and the outer end 6 of the collar is flanged inwardly so as to force the locking member 5 against the end wall of the nut body and to retain it in position. The operation of attaching the collar to the nut body causes the axial projections 2 on the collar to extend slightly inwardly from the wall of the collar and they therefore engage the locking member 5 when it is in its final position against the nut body and act as keys to lock the member against rotation.

In an alternative arrangement shown in FIGURE 7, the projections 2 are deformed during the attachment of the collar 1 to the nut body 3 so that they lie flat against the end face of the nut body. In this position the projections 2 also act as keys to prevent rotation of the locking member 5 which is pressed against them when the outer end 6 of the collar is flanged inwardly.

Where keying of the locking member is not necessary or is effected by other means, the projections 2 may be omitted and in this case the end of the collar 1 may be folded outwardly against the outer wall of the collar as shown in FIGURE 8.

In some cases the collar 1 may be formed with the flange at its outer end 6 before it is assembled on the nut body 4. Alternatively the flanging of the collar and its assembly on the nut body may be carried out in one operation, the elastic locking member 5 having been previously positioned within the collar. The whole assembly operation may conveniently be carried out by automatic or semi-automatic machining and the actual sequence of operations arranged as required.

The improved method of manufacturing locknuts in accordance with this invention affords many advantages over prior methods more especially since, provided the folded portion 9 of the collar is pressed fully home into the groove in the nut body, a successful joint is assured and there is no uncertainty as to its strength such as exists in the case where the collar is welded to the nut body. Moreover, the construction is simple and inexpensive since standard nut bodies may be used and the provision of the frusto-conical groove 3 is a simple and inexpensive operation.

A further advantage of the construction of this invention is that if the collar were attached to the nut body by the method described but without folding the end of the collar to provide a portion of double thickness, a wall thickness of the collar which is amply sufficient to provide the requisite strength would require a groove in the nut body which is inconveniently narrow for ease in production, and it is obviously uneconomic to use a collar of thicker material than required merely to enable a wide groove to be used. By folding the end of the collar, however, the groove width can be increased to an extent which greatly facilitates production while enabling the thickness of the collar to be held at a suitable value.

A further and important advantage of this invention is that the manufacturers need not hold large stocks of locknuts of different sizes in order to meet any demands since standard nut bodies are always available in quantity and their conversion into locknuts in accordance with this invention is very simply and quickly achieved.

We claim:

1. A locknut comprising a nut body formed with an inwardly extending annular groove in one end face thereof, the mean diameter of said groove at its root being different from that at its opening in the said end face, a collar comprising a hollow cylindrical sleeve one end of which is folded inwardly upon itself to provide an end portion of double thickness, said end portion being housed in said groove, and the other end of which is formed with an inwardly directed flange, and a ring of elastic material housed in the space defined by the end face of said nut body, the wall of said collar and the inwardly directed flange thereon.

2. A locknut as claimed in claim 1, in which said collar has on its folded end at least one projection extending therefrom for engaging said ring.

3. A locknut comprising a nut body formed with an inwardly extending conical annular groove of uniform width in one end face thereof, the mean diameter of said groove being greater at its root than at its opening, the side walls of which are substantially parallel and uninterrupted throughout their entire height, a collar comprising a hollow cylindrical sleeve one end of which is folded inwardly upon itself to provide an end portion of double thickness, said folded end portion being forced into said conical groove in engagement with the side walls of the groove throughout their entire height so that is is deformed therein to set up a strong interlock between said collar and nut body, and the other end of which is formed with an inwardly directed flange, and a ring of elastic material housed in the space defined by the end face of said nut body, the wall of said collar and the inwardly directed flange thereon.

4. In a locknut of the kind in which a locking member is secured on an end face of the nut concentric with the threaded aperture therein, the method of securing the locking member in position which consists in forming in an end face of the nut an inwardly extending circular groove of uninterrupted wall formation and having a mean diameter at its opening which is smaller than that at its root, forming a retainer for the locking member with a cylindrical skirt, folding the end portion of the skirt upon itself so that the folded portion has a mean diameter equal to that of the opening of the groove in the said end face, and pressing the retainer against the said end face so as to cause the folded end portion of the said skirt to penetrate to the root of the groove and to be expanded by engagement with the parallel uninterrupted wall formation of the groove, whereby to lock the said retainer to the nut.

5. The method of manufacturing a locknut of the kind in which a locking member comprising a ring of elastic material is secured by a walled retaining member on an end face of the nut concentric with the threaded aperture therein, which consists in forming the said end face with an inwardly extending circular groove of frusto-conical shape having uninterrupted parallel side walls, forming at least one projection on one end of a cylindrical retaining member, folding the said end inwardly upon itself, pressing the said end against said end face to cause said end to penetrate said groove and become deformed by engagement with the uninterrupted side walls thereof, positioning said ring against said end face and within said retaining member, and forming over the other end of said retaining member to retain said ring against said end face and in frictional engagement with said projection.

References Cited in the file of this patent

UNITED STATES PATENTS

| | | |
|---|---|---|
| 2,205,008 | Gray | June 18, 1940 |
| 2,727,551 | Rees | Dec. 20, 1955 |

FOREIGN PATENTS

| | | |
|---|---|---|
| 15,074 | Great Britain | Aug. 7, 1894 |